United States Patent Office 3,632,566
Patented Jan. 4, 1972

3,632,566
SULFUR-CONTAINING COMPOSITIONS
Lester E. Coleman, Willoughby Hills, Ohio, assignor to
The Lubrizol Corporation, Wickliffe, Ohio
No Drawing. Division of application Ser. No. 784,172,
Dec. 16, 1968, now Patent No. 3,498,915, which is a
continuation-in-part of application Ser. No. 657,520,
Aug. 1, 1967, which in turn is a continuation-in-part
of application Ser. No. 602,600, Dec. 19, 1966. Divided
and this application July 14, 1969, Ser. No. 842,083
Int. Cl. C07g 17/00
U.S. Cl. 260—125                             11 Claims

ABSTRACT OF THE DISCLOSURE

Sulfur-containing compositions characterized by the presence of at least one cycloaliphatic group with at least two nuclear carbon atoms of one cycloaliphatic group or two nuclear carbon atoms of different cycloaliphatic groups joined through a divalent sulfur linkage. The sulfur linkage contains at least two sulfur atoms. Sulfurized Diels Alder adducts are illustrative of the compositions disclosed. These sulfur-containing compositions are particularly useful as extreme pressure and antiwear additives in various lubricating oils.

---

This is a division of copending application Ser. No. 784,172, filed Dec. 16, 1968, now U.S. Pat. 3,498,915 which is a continuation-in-part of application Ser. No. 657,520 filed Aug. 1, 1967, now abandoned, which in turn is a continuation-in-part of application Ser. No. 602,600 filed Dec. 19, 1966, now abandoned.

This application relates to novel sulfur-containing organic compounds, compositions containing them, methods for their use, and processes for the preparation thereof. In particular, the invention relates to sulfur-containing compounds characterized by the presence within their structures of at least one cycloaliphatic group, to lubricants, fuels, and other compositions containing these compounds, and to a method for imparting oxidation-corrosion resistance properties and extreme pressure capabilities to lubricants and the like.

Accordingly, it is a principal object of this invention to provide novel sulfur-containing organic compounds.

Another object is to provide novel sulfur-containing organic compounds useful as additives in lubricant compositions.

A further object is to provide lubricant compositions characterized by imparting corrosion and oxidation resistance to metals exposed thereto.

A still further object is to provide lubricant compositions capable of withstanding extreme pressures while retaining their lubricating properties.

An additional object of the invention is to provide methods for imparting extreme pressure and oxidation-corrosion inhibiting properties to lubricants.

Still another object is to provide sulfur-containing compounds useful as additives which inhibit oxidation and corrosion of metals exposed to diesel oils, kerosene, fuel oils, and other hydrocarbon liquids.

These and other objects of this invention are accomplished by providing oil-soluble sulfur-containing organic compounds characterized by the presence within their structure of at least one substituted cycloaliphatic group wherein at least one nuclear carbon of said group is attached via a divalent sulfur radical containing at least two sulfur atoms to another nuclear carbon of said substituted cycloaliphatic group or a nuclear carbon of a different cycloaliphatic group, at least one substituent on the substituted cycloaliphatic group being other than a saturated aliphatic hydrocarbon radical. These compounds are prepared by heating a reaction mixture comprising sulfur and at least one cycloaliphatic compound having at least one unsaturated carbon-to-carbon bond in the cycloaliphatic nuclei. The compounds and their methods of preparation are discussed more fully hereinafter.

STARTING MATERIALS

The unsaturated cycloaliphatic reactants contemplated as starting materials for synthesizing the compounds of this invention can be represented by the following formula:

Formula I

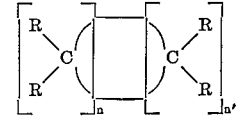

In Formula I, $n$ and $n'$ are integers of zero to nine with the proviso $5 \leq n+n' \leq 10$ and at least a pair of R's, one R from each of two adjacent nuclear carbons, together form an additional carbon-to-carbon bond so that there is at least one unsaturated carbon-to-carbon linkage in the cycloaliphatic nucleus.

The remaining R's are each independently:

(1) Hydrogen
(2) Hydrocarbyl
(3) A heterocyclic radical including fused ring heterocyclic radicals and preferably those monocyclic heterocyclic radicals having from five to six atoms in the nucleus thereof, not more than three being hetero atoms selected from the class consisting of nitrogen, sulfur, and oxygen, the remainder being carbon.
(4) The radical

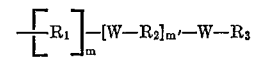

where $m$ is zero or one and $m'$ is zero or a positive whole number of up to about twenty and, preferably, not more than about ten, the W's are independently oxygen, divalent sulfur or $=N-R_4$, $R_1$ and $R_2$ are hydrocarbylene of up to about thirty carbons, $R_3$ and $R_4$ are hydrogen, hydrocarbyl of up to about thirty carbons, acyl, and $-NR_5R_6$ wherein $R_5$ and $R_6$ are hydrogen, hydrocarbyl of up to about thirty carbons and acyl and together $R_5$ and $R_6$ (and when the terminal W is $=N-R_4$, then also $R_3$ and $R_4$) together with the nitrogen to which they are attached may represent a five- or six-membered nitrogen-containing monocyclic heterocyclic radical of the type discussed above, i.e., can be

or

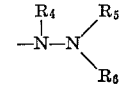

can be

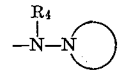

where

represents the nitrogen-containing monocyclic heterocyclic radical. In addition to the hetero nitrogen, the radical can contain hetero oxygen, hetero sulfur, and/or additional hetero nitrogen but not more than three of the nuclear atoms should be hetero atoms, the remainder being carbon. Examples of such heterocyclic groups are 1-pyrrolinyl, 1-pyrazolidinyl, 1-imidazolinyl, 1-piperidyl, 1-piperazinyl, 1-(4-ethylpiperazinyl), 1-(4-hydroxyethylpiperazinyl), 4-morpholinyl, etc.

(5) The radical

where W' is the same as W hereinabove and $R_7$ is hydrogen, halo, hydrocarbyl of one to thirty carbons, and the radical

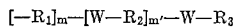

as defined above.

(6) the groups

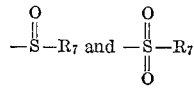

is as defined above.

(7) Acyl.
(8) Cyano
(9) Nitro
(10) Halo

In the addition to the monovalent groups enumerated above to which the R's may individually correspond, one or more pairs of R's can also represent divalent groups as follows:

(A) A pair of R's, one from each of two non-adjacent nuclear carbons can represent (1) a carbon-to-carbon bond between these carbons or (2) a divalent aliphatic radical (e.g. alkylene, oxy, etc.), both valences not arising from the same atom in the group, thereby encompassing polycyclic (e.g., bicyclic, etc.) cycloaliphatic compounds.

(B) A pair of R's on the same carbon can represent a divalent aliphatic group (e.g., alkylene), both valences of the group not arising from the same atom in the group, thereby encompassing spirocyclic cycloaliphatic compounds.

The term "hydrocarbyl" as used in the specification and claims is intended to encompass the monovalent radical of an aliphatic, cycloaliphatic, aromatic, arylaliphatic, aliphaticaryl, arylcycloaliphatic, cycloaliphaticalkylaryl, cycloaliphaticaryl, and cycloaliphaticalkyl hydrocarbon, and the like of up to about 30 carbons. Similarly, "hydrocarbylene" encompasses the divalent radicals derived from these corresponding monovalent hydrocarbon radicals while "hydrocarbylidene" is intended to encompass the corresponding divalent radicals where the valences are derived from the same carbon atoms within the hydrocarbon group.

It is to be understood that the terms hydrocarbyl, hydrocarbylene, and hydrocarbylidene, can encompass those hydrocarbon groups which contain non-hydrocarbon substituents such as halo, nitro, lower alkoxy, lower alkyl mercapto, hydroxy, mercapto, amino, and the like so long as the hydrocarbon character of the groups is not destroyed. The presence or absence of such substituents on the hydrocarbon groups is not an essential or critical feature of the invention. Such modification of the hydrocarbon groups is well within the skill of the art and does not represent a departure from the concept of the claimed invention. Normally, if substituents are present, there will not be more than four such substituents per group and not more than one such substituent for every two to three carbon atoms in the hydrocarbon group.

Hydrocarbyl radicals are illustrated by:

(1) Alkyl of up to about thirty carbons: Methyl, ethyl, propyl, isopropyl, butyl, tertiary butyl, heptyl, nonyl, decyl, tridecyl, octadecyl, tricosyl, octacosyl, etc.

(2) Alkenyl of up to about thirty carbons: Ethenyl, allyl, 1-butenyl, isobutenyl, 2-pentenyl, 3,4-dimethyl-2-hexenyl, 1-octenyl, 1-decenyl.

(3) Cycloalkyl of up to about thirty carbons: Cyclopentyl, cyclohexyl, cyclooctyl, alkylcycloalkyl such as 2,3-dibutylcyclohexyl, cycloalkylcycloalkyl such as 3-cyclohexylcyclohexyl, etc. (preferably, the number of carbons in the nucleus of the cycloalkyl groups is five or six, any additional carbons in these groups being derived from hydrocarbon containing substituents attached thereto, the total number of carbons being up to about twenty).

(4) Cycloalkenyl of up to about thirty carbons: Cyclopentenes, cyclohexenes, cycloheptenes, etc. corresponding to the above class of cycloalkyl groups but containing at least one ethylenic linkage in the nucleus thereof.

(5) Aryl of up to about thirty carbons; phenyl, napthyl, alkylaryl such as didecylphenyl and tolyl, 3-propylnaphthyl, alkenylaryl such as p-allyl-phenyl, cycloalkyl aryl such as 3-cyclohexylphenyl, etc.

It is clear that there are many obvious variations of these hydrocarbyl groups which are clearly equivalent and fall within the scope of the present invention. Thus, other representative hydrocarbyl groups are arylalkyl such as benzyl and phenethyl, alkylarylalkyl such as tolylpropyl, cycloalkylalkyl such as cyclohexylmethyl, and the like.

Substituted hydrocarbyls considered substantial equivalents of the above are β - chloroethyl, 3 - nitropropyl, p-ethoxyphenyl, 3 - propoxycyclohexyl, 3 - hydroxypropyl, 3 - trifluoromethylphenyl, (β - hydroxy - ethoxy)ethyl, 3-amino-naphthyl, etc.

Hydrocarbylene groups are exemplified by the corresponding divalent class of radicals, that is, divalent radicals which are analogous in composition and structure to those monovalent radicals used to illustrate hydrocarbyl groups. This would include alkylene of one to thirty carbons such as methylene, butylene-1,3, amylene, decylene, and the like; alkenylene such as ethenylene, 1-decenylene; cycloalkylene such as cyclohexylene; arylene such as phenylene and the like. The preferred hydrocarbylene groups are the alkylene and alkenylene groups of up to thirty carbons, and preferably up to about twenty carbons.

Similarly, hydrocarbylidene groups can be illustrated by those divalent radicals corresponding to the monovalent radicals illustrating hydrocarbyl groups above where the valences arise from the same carbon in the group; i.e., alkylidene such as $CH_2=$, $CH_3-CH=$, $(CH_3)_2C=$, cycloalkylidene, alkenylidene, arylalkenylidene, aralkylidene, etc.

Representative of the preferred five to six membered heterocyclic radicals contemplated by this invention as defined hereinabove are pyrrolyl, pyrrolidinyl, pyrrolinyl, chromanyl, pyranyl, isochromanyl, thienyl, imidazolidinyl, imidazolinyl, pyrazolidinyl, pyrazolinyl, piperidyl, piperazinyl, morpholinyl, thiomorpholinyl, and the like. Also included within this group of heterocyclic radicals are the corresponding substituted heterocyclic radicals containing from one to three substituents selected from the class consisting of lower alkyl, lower alkoxy, halo, hydroxy, mercapto, lower alkylmercapto, nitro, amino, and lower alkyl amino.

Within the genus of radicals represented by the formula

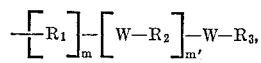

a preferred subgroup is that wherein $R_1$ and $R_2$ are each alkylene or alkenylene of up to about ten carbons and $R_3$ is hydrogen, acyl, lower alkyl, and lower alkenyl. When W is $=N-R_4$, $R_4$ is preferably hydrogen, acyl, lower alkenyl, or lower alkyl. A further preferred subgenus is that wherein $R_1$ and $R_2$ are alkylene, $R_3$ is hydrogen, acyl, or lower alkyl, and when W is $=N-R_4$, $R_4$ is hydrogen, acyl, or lower alkyl.

The adjective "lower" as employed in conjunction with a term representing a hydrocarbon-containing radical in the specification and claims is intended to limit the carbon content of the hydrocarbon radical to a maximum of seven carbons. Thus "lower alkyl" includes methyl, ethyl, butyl, tertiary butyl, isoamyl, heptyl, etc.

Acyl groups encompassed by the term "acyl" as used in the present invention are those acyl radicals formed by removal of an —OH or —SH group from an organic acid. The acyl radicals can be derived from organic phosphorus acids, organic thiophosphorus acids, organic sulfur acids, carboxylic acids, and thiocarboxylic acids.

The phosphorus and thiophosphorus acids include the tri- and pentavalent organic phosphorus acids of the formula

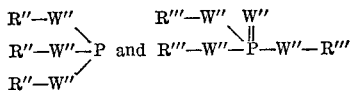

Formula II(a)   Formula II(b)

wherein W''' is oxygen or divalent sulfur, at least one of R'' and R''' is hydrogen and the remainder are hydrogen or organic radicals, generally hydrocarbyl of one to thirty carbons and preferably alkyl, cycloalkyl, or aryl groups. Examples of such acids include dicapryldithiophosphoric acids, dilauryldithiophosphoric acids, dicapryldithiophosphorous acids, di-(methylcyclohexyl)-dithiophosphorous acids, laurylmonothiophosphorous acids, laurylmonothiophosphoric acids, di-(butylphenyl)-dithiophosphoric acids, etc.

The sulfur acids include acids of the formula

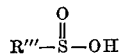

and

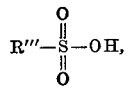

and the like where R''' is as defined above for the phosphorus and the thiophosphorus acids. Examples of these acids are alkylsulfinic acids, alkylsulfonic acids, cycloalkylsulfinic acids, cycloalkylsulfonic acids, arylsulfinic acids, arylsulfonic acids, and the like. Specific examples include ethane sulfinic acid, naphthalene sulfinic acids, benzene sulfonic acid, butane sulfinic acid, petrosulfonic acids, cyclohexyl sulfonic acid, etc.

The carboxylic and thiocarboxylic acids from which the acyl radicals are derived correspond to the formula

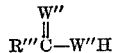

wherein W''' and R''' are as defined in the above discussion of the phosphorus and thiophosphorus acids. Included within this class of acids are the alkanoic acids, particularly the lower alkanoic acids, the higher fatty acids, arylcarboxylic acids, cycloaliphatic carboxylic acids, and their corresponding thio analogs. Illustrative of these acids are formic acid, oxalic acid, acetic acid, butanoic acid, lauric acid, stearic acid, myristic acid, oleic acid, palmitic acid, benzoic acid, cyclohexylcarboxylic acid, dithioacetic acid, thionacetic acid, thiolacetic acid, thionobenzoic acid, and the like.

A preferred group of starting materials from the overall standpoint of availability, economy, and the performance of the final products are the Diels-Alder adducts. These are a well-known, art-recognized class of compounds prepared by the diene synthesis or Diels-Alder reaction. A summary of the prior art relating to this class of compounds is found in the Russian monograph, Dienovyi Sintes, Izdatelstwo Akademii Nauk SSSR, 1963 by A. S. Onischenko. (Translated into the English language by L. Mandel as A. S. Onischenko, Diene Synthesis, N.Y., Daniel Davey and Co., Inc. 1964.) To avoid useless repetition of what is well-known in the art, this monogram and reference cited therein are incorporated by reference into the present specification.

Basically, the diene synthesis (Diels-Alder reaction) involves the reaction of a conjugated diene,

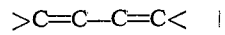

with an ethylenically or acetylenically unsaturated compound,

or —C≡C—, these latter being known as dienophiles. The reaction can be represented as follows:

Reaction 1

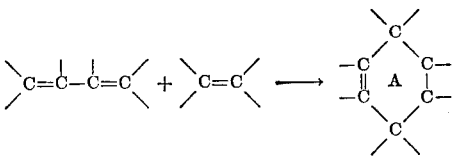

Reaction 2

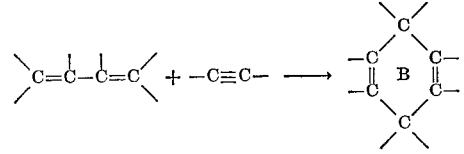

The products, A and B are commonly referred to as Diels-Alder adducts. It is these adducts which are used as starting materials for the preparation of the novel sulfurized Diels-Alder adducts of the invention.

Representative examples of these 1,3-dienes include aliphatic conjugated diolefins or dienes of the formula

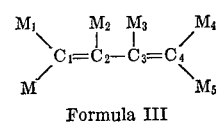

Formula III wherein M through $M_5$ are the same as R in Formula I with the proviso that a pair of M's on adjacent carbons do not form an additional double bond in the diene. Preferably not more than three of the M variables are other than hydrogen and at least one is hydrogen. Moreover, when M through $M_5$ are other than hydrogen, they are preferably alkyl, halo, alkoxy, alkenyl, alkenyloxy, carboxy, cyano, amino, alkylamino, dialkylamino, phenyl and phenyl substituted by one to three substituents corresponding to these M variables. Normally the total carbon content of the diene will not exceed twenty. In the most preferred aspect of the invention, adducts are used where $M_2$ and $M_3$ are both hydrogen and at least one of the remaining M variables is also hydrogen. Preferably, the carbon content of these M variables when other than hydrogen is seven or less. In this most preferred class, those dienes where M, $M_1$, $M_4$, and $M_5$ are hydrogen, chloro, or lower alkyl are especially useful. Piperylene, isoprene, methylisoprene, chloroprene, and 1,3-butadiene are among the latter especially preferred dienes for use in preparing the Diels-Alder adducts. Other specific aliphatic conjugated dienes illustrative of those represented by Formula III are presented in Table I.

TABLE I—DIENES

| M | M₁ | M₂ | M₃ | M₄ | M₅ |
|---|---|---|---|---|---|
| CH₃— | | | | | |
| phenyl | | | | | |
| HOOC— | | | | | |
| N≡C— | | | | | |
| CH₃O— | | | | | |
| CH₃C(O)—O— | | | | | |
| (CH₃CH₂)₂N— | | | | | |
| CH₃CH₂O— | | | | | |
| NO₂— | | | | | |
| CH₃O—C(O)— | | | | | |
| H—C(O)— | | | | | |
| | | CH₃— | | | |
| | | Phenyl | | | |
| | | CH₃O— | | | |
| | | H—C(O)—O— | | | |
| | | Cl— | | | |
| CH₃(CH₂)₃— | | | | | |
| tert-butyl | | | | | |
| | | i-propyl | | | |
| | | tert-butyl— | | | |
| CH₃— | | CH₃— | | | |
| CH₃— | | phenyl— | | | |
| CH₃— | | Cl— | | | |
| CH₃CH₂— | | Cl— | | | |
| phenyl— | | CH₃CH₂— | | | |
| phenyl— | | CH₃O—C(O)— | | | |
| phenyl— | | phenyl— | | | |
| CH₃— | CH₃— | CH₃— | | | |
| CH₃— | CH₃ | i-propyl— | | | |
| phenyl— | | | | CH₃— | |
| | | CH₃— | phenyl— | | |
| | | Cl— | CH₃— | | |
| HOOC— | | | | HOOC— | |
| phenyl— | | phenyl— | | CH₃— | |
| phenyl— | | | phenyl— | | |
| | | phenyl— | phenyl— | | |
| Cl— | | CH₃— | | | Cl— |
| Br— | | | | | |
| Cl— | | | CH₃— | | |
| CF₃— | | | CH₃— | | |
| CF₃— | | | | | |
| | CF₃— | | | | |
| | F— | | | | |
| | Br— | | | | |
| CH₃(CH₂)₃—O— | | | CH₃CH₂O— | | |
| CH₃(CH₂)₅— | | | | HOOC—(CH₂)₇— | |
| CH₃CH₂CH₂O— | | | | | |
| CH₃CH₂— | | | | CH₃CH₂— | |
| p-chlorophenyl— | | | | | |
| cyclohexoxy— | | | | | |
| | | F— | | | |
| tolyl— | | | | | |
| p-fluorophenyl | | | | | |
| 3,4-dimethoxyphenyl | | | | | |
| 3,4-methlenedioxyphenyl | | | | | |

NOTE: Unless otherwise indicated, the various M variables in this table are hydrogen.

In addition to these linear 1,3-conjugated dienes, cyclic dienes are also useful as reactants. Examples of these cyclic dienes are the cyclopentadienes, fulvenes, 1,3-cyclohexadienes, 1,3-cycloheptadienes, 1,3,5-cycloheptatrienes, cyclooctatetraene, and 1,3,5-cyclononatrienes. Various substituted derivatives of these compounds enter into the diene synthesis. However, with the exception of the cyclopentadienes and the 1,3-cyclohexadienes, the availability of the remaining cyclic reactants at the present time makes them commercially unfeasible for preparing the compounds of the present invention.

The dienophiles suitable for reacting with the above dienes to form the adducts used as reactants can be represented by the formula Formula W

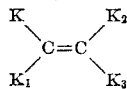

wherein the K variables are the same as the R variables in Formula I above with the proviso that a pair of K's may form an additional carbon-to-carbon bond, i.e., K—C≡C—K₂, but do not necessarily do so.

A preferred class of dienophiles are those wherein at least one of the K variables is selected from the class of electron-accepting groups such as formyl, cyano, nitro, carboxy, carbohydrocarbyloxy, hydrocarbylcarbonyl, hydrocarbylsulfonyl, carbamyl, acylcarbamyl, N-acyl-N-hydrocarbylcarbamyl N-hydrocarbylcarbamyl, and N,N-dihydrocarbylcarbamyl. Those K variables which are not electron-accepting groups are hydrogen, hydrocarbyl, or substituted-hydrocarbyl groups. Usually the hydrocarbyl and substituted hydrocarbyl groups will not contain more than ten carbon atoms each.

The hydrocarbyl groups present as N-hydrocarbyl substituents are preferably alkyl of one to thirty carbons and especially one to ten carbons. Representative of this class of dienophiles are the following: nitroalkenes, e.g., 1-nitrobutene-1, 1-nitropentene-1, 3-methyl - 1 - nitrobutene-1, 1-nitroheptene-1, 1-nitrooctene-1, 4 - ethoxy-1 nitrobutene-1; alpha,beta-ethylenically unsaturated aliphatic carboxylic acid esters, e.g., alkylacrylates and α-methyl alkylacrylates (i.e., alkyl methacrylates) such as butylacrylate and butylmethacrylate, decyl acrylate and decylmethacrylate, di-(n-butyl)-maleate, di-(t-butyl)-maleate; acrylonitrile, methacrylonitrile, beta-nitrostyrene, methylvinylsulfone, acrolein, acrylic acid; alpha,beta-ethylenically unsaturated aliphatic carboxylic acid amides, e.g., acrylamide, N,N-dibutylacrylamide, methacrylamide, N-dodecylmethacrylamide, N-pentylcrotonamide; crotonaldehyde, crotonic acid, β,β-dimethyldivinylketone, methyl-vinylketone, N-vinyl pyrrolidone, alkenyl halides, and the like.

An especially preferred class of dienophiles are those wherein at least one K variable is

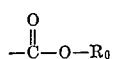

where $R_0$ is the residue of a saturated aliphatic alcohol of up to about forty carbon atoms; e.g., for example at least one K is carbohydrocarbyloxy such as carboethoxy, carbobutoxy, etc. the aliphatic alcohol from which —$R_0$ is derived can be a mono or polyhydric alcohol such as alkyleneglycols, alkanols, aminoalkanols, alkoxy-substituted alkanols, ethanol, ethoxy ethanol, propanol, β-diethylaminoethanol, dodecyl alcohol, diethylene glycol, tripropylene glycol, tetrabutylene glycol, hexanol, octanol, isooctyl alcohol, and the like. In this especially preferred class of dienophiles, not more than two K variables will be

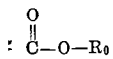

groups and the remaining K variables will be hydrogen or lower alkyl, e.g., methyl, ethyl, propyl, isopropyl, and the like.

Examples of dienophiles of the type discussed above appear in Table II hereafter.

TABLE II.—DIENOPHILES

| K | K₁ | K₂ | K₃ |
|---|---|---|---|
| CH₂=CH—CH= | | | |
| phenyl— | | | |
| —C≡N— | | | |
| H—C(=O)— | | | |
| CH₃O—C(=O)— | | | |
| CH₃CH₂O—C(=O)— | i-propyl | | |
| CH₂=CH— | | | |
| CH₃—C(=O)— | | | |
| HOOC— | | | |
| HOOC— | | o-nitrophenyl | |
| CH₂=CH—C(=O)—C— | | —CH₃ | |
| CH₃CH₂O—C(=O)— | —CH₃ | | |
| HOOC— | | HOOC— | |
| —O—C(=O)— | | —C(=O)— | (¹) |
| H— | H— | H— | H— |
| CH₃ | | | |
| HC≡C— | | | |
| CH₃C(=O)—O— | | | |
| ClCH₂— | | | |
| BrCH₂— | | | |
| HOCH₂— | | | |
| CH₃—S(=O)₂— | | | |
| α-pyridyl | | | |
| β-pyridyl | | | |
| α-pyridyl | | | |
| NO₂ | | CH₃CH₂— | |
| o-nitrophenyl | | | |
| m-nitrophenyl | | | |
| p-nitrophenyl | | | |
| NO₂ | | phenyl | |
| NO₂ | | p-methoxyphenyl | |
| Cl—S(=O)₂— | | | |
| NO₂ | | CH₃CH₂CH₂— | |
| NO₂ | | CH₃(CH₂)₅— | |
| CH₃(CH₂)₃O—C(=O)— | —CH₃ | | |
| H—C(=O)— | | phenyl | |
| HOOC— | naphthyl | | |
| HOOC— | | CH₃C(=O)— | |
| CH₃CH₂C(=O)— | | CH₃C(=O)— | |
| H—C(=O)— | | CH₃— | |
| HOOC— | | CH₃— | |
| ClCH₂—C(=O)— | | | |
| phenyl | | Cl— | |
| phenyl-C(=O)— | | phenyl-C(=O)— | |
| CH₃CH₂O—C(=O)— | CH₃CH₂O—C(=O)— | | |
| CH₃CH₂O—C(=O)— | CH₃CH₂O—C(=O)— | | |
| CH₃CH₂O—C(=O)— | CH₃CH₂O—C(=O)— | —CH₃ | |
| CH₃CH₂O—C(=O)— | CH₃CH₂O—C(=O)— | i-propyl | |
| CH₃CH₂O—C(=O)— | CH₃CH₂O—C(=O)— | i-butyl | |
| CH₃CH₂O—C(=O)— | CH₃CH₂O—C(=O)— | phenyl | |
| cetyl-O—C(=O)— | | cetyl-O—C(=O)— | |
| HOOC— | HOOC—CH₂— | HOOC— | |
| HOOC— | CH₃— | | |
| Cl—C(=O)— | | | |

¹ I.e. maleic anhydride.
NOTE: Unless otherwise indicated the various K variables in this table are hydrogen.

In addition to the ethylenically unsaturated dienophiles, there are many useful acetylenically unsaturated dienophiles such as propiolaldehyde, methylethynylketone, propylethynylketone, propenylethynylketone, propiolic acid, propiolic acid nitrile, ethylpropiolate, tetrolic acid, propargylaldehyde, acetylenedicarboxylic acid, the dimethyl ester of acetylenedicarboxylic acid, dibenzoylacetylene, and the like.

Cyclic dienophiles include cyclopentenedione, coumarin, 3-cyanocoumarin, dimethyl maleic anhydride, 3,6-endomethylene-cyclohexenedicarboxylic acid, etc. With the exception of the unsaturated dicarboxylic anhydrides derived from linear dicarboxylic acids (e.g., maleic anhydride, methylmaleic anhydride, chloromaleic anhydride), this class of cyclic dienophiles are limited in commercial usefulness due to their availability and other economic considerations.

The reaction products of these dienes and dienophiles correspond to the general formulae

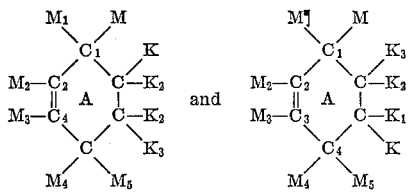

Formula V wherein M through $M_5$ and K through $K_3$ are as defined hereinbefore. If the dienophile moiety entering into the reaction is acetylenic rather than ethylenic, two of the K variables, one from each carbon, from another carbon-to-carbon double bond. Where the diene and/or the dienophile is itself cyclic, the adduct obviously will be bicyclic, tricyclic, fused, etc., as exemplified below:

Reaction 3

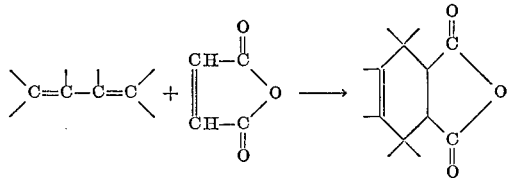

Reaction 4

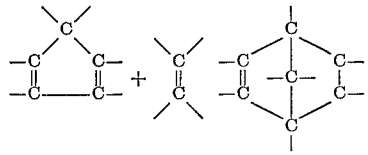

Normally, the adducts involve the reaction of equimolar amounts of diene and dienophile. However, if the dienophile has more than one ethylenic linkage, it is possible for additional diene to react if present in the reaction mixture.

PROCESS

The sulfur-containing compounds of the present invention are readily prepared by heating a mixture of at least one of the substituted unsaturated cycloaliphatic compounds of the type discussed hereinabove and sulfur at a temperature within the range of from about 110° C. to just below the decomposition temperature of the Diels-Alder adducts. Temperatures within the range of about 110° to about 200° C. will normally be used. This reaction results in a mixture of products, some of which have been identified. In the compounds of known structure, the sulfur reacts with the substituted unsaturated cycloaliphatic reactants either at a double bond in the nucleus of the unsaturated reactant or at an allylic hydrogen and forms a divalent sulfur radical, containing at least two sulfur atoms, which joins two nuclear carbons of the same or different cycloaliphatic group.

The ratio of reactants can vary over a wide range, for example, a molar ratio of sulfur to unsaturated cycloaliphatic reactant of from about 0.5:1.0 to 10.0:1.0. As it is normally desirable to incorporate as much stable sulfur into the sulfur-containing compound as possible, a molar excess of sulfur is normally employed. Generally, the molar ratio of sulfur to unsaturated reactant will be about 1.0:1.0 to about 4.0:1.0 and preferably about 2.0:1.0 to about 4.0:1.0 based on the presence of one ethylenically unsaturated bond in the cycloaliphatic nucleus. If there are additional unsaturated bonds in the cycloaliphatic nucleus, the ratio of sulfur may be increased.

The reaction can be conducted in the presence of suitable inert organic solvents such as mineral oils, alkanes of seven to eighteen carbons, etc., although no solvent is generally necessary. After completion of the reaction, the reaction mass can be filtered and/or subjected to other conventional purification techniques. There is no need to separate the various sulfur-containing products as they can be employed in the form of a reaction mixture comprising the compounds of known and unknown structure.

As hydrogen sulfide is an undesirable contaminant in lubricants, etc. it is advantageous to employ standard procedures for assisting in the removal of the $H_2S$ from the products. Blowing with steam, alcohols, or nitrogen gas assists in the removal of $H_2S$ as does heating at reduced pressures with or without the blowing.

PRODUCTS

The reaction of a compound corresponding to Formula I and sulfur results in a mixture of products, those of known structure corresponding to the general formulae:

Formula VI

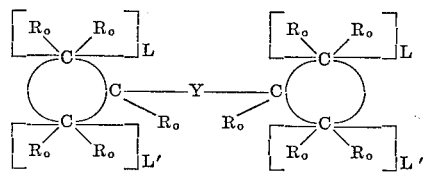

Formula VII

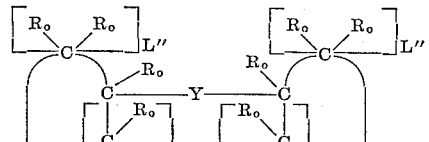

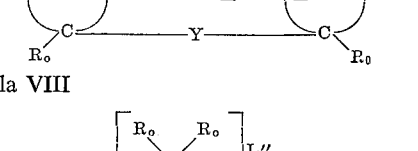

Formula VIII

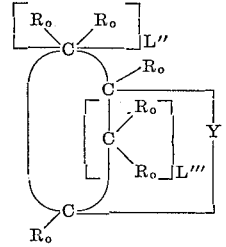

wherein the $R_o$'s are the same as R in Formula I with the exception that it is not necessary that at least one pair of $R_o$'s on adjacent carbons form another carbon-to-carbon bond. If there is only one double bond in the cycloaliphatic ring and the sulfur reacts at this point, there would be no double bond remaining. On the other hand, if the sulfur reacts with an allylic hydrogen, the double bond need not be disturbed. Analysis of the products show that the sulfur reacts at both points producing both types of products. Y represents a divalent sulfur radicals, L, L', L", and L''' are integers of zero to nine with the proviso that $4 \leq L + L' \leq 9$ and $3 \leq L'' + L''' \leq 8$.

A preferred group of compounds are those wherein the total number of carbons in the rings is five or six, i.e., $L+L=4$ or 5 and $L''+L'''=3$ or 4. A particularly useful group of compounds are those wherein from one to five of the $R_o$'s in each of the cycloaliphatic nuclei are other than hydrogen and at least one such substituent in each compound is other than saturated aliphatic hydrocarbyl.

When the unsaturated cycloaliphatic reactant is a Diels-Alder adduct, such as represented by Formula V (A) or (B), the sulfur-containing products of known structure correspond to the following generic formulae:

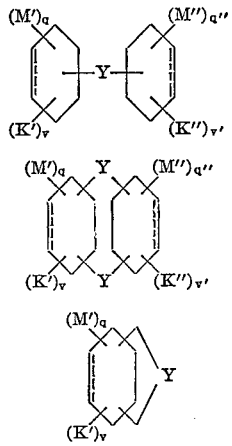

wherein M' and M'' are the same as M through $M_5$ above and K' and K'' are the same as K through $K_3$ above. Y is a divalent sulfur radical. The variables $q$ and $q''$ are zero or a positive whole number of one to six while $v$ and $v'$ are zero or positive whole numbers of one to four, at least one of M', M'', K', and K'' in each compound being other than hydrogen or a saturated aliphatic hydrocarbon radical. Generally not more than five of the M and K variables on each ring are other than hydrogen. Preferably, at least one K variable in each compound will be an electron accepting group of the type discussed supra. The preferred class of substituents discussed hereinbefore with regard to the various "K" and "M" variables on the intermediates for making the Diels-Alder adducts and the adducts themselves obviously applies to the final products prepared from the intermediates.

An especially preferred class of sulfurized Diels-Alder adducts within the ambit of Formulae IX–XI is that wherein at least one of the K variables is an electron accepting group from the class consisting of

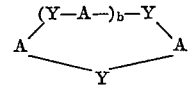

wherein W'' and $R_7$ are as defined above. Preferably, W'' is oxygen and $R_7$ is hydrogen, halo, alkyl of one to thirty carbons, alkenyl of one to thirty carbons, hydroxy, alkoxy of one to thirty carbons, alkenoxy of one to thirty carbons, amino, alkylamino and dialkylamine wherein the alkyl groups contain from one to thirty carbons and preferably one to ten carbons. When $R_7$ is halo, chloro is preferred. Particularly useful are those compounds wherein the M's are hydrogen or lower alkyl and one K variable is carboalkoxy of up to thirty-one carbon atoms, the remaining $K'_2$ being hydrogen, lower alkyl, or another electron accepting group. Within this latter group, those wherein the carboalkoxy group is carbo-n-butoxy produce excellent results as lubricant additives.

The divalent sulfur radical —Y— is representative of a divalent sulfur group containing an average of from two to about ten sulfurs per divalent radical. Sulfur radicals containing from two to six sulfurs are particularly useful. Illustrative of the radicals are the following: ($-S_r-$) where $r$ is a whole number of two to ten such as

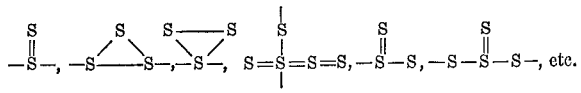

The sulfur generally is present in the linear polysulfide form, i.e., $-S_x-$ where $x$ is a whole number of two to ten and preferably two to six, e.g., —S—S—, —S—S—S—S—, and —S—S—S—S—S—S—.

In addition to these reaction products of known structure, there are additional sulfur-containing reaction products of unknown structure present within the reaction mass which are useful in the same manner as the products of known structure. While it has not been determined conclusively, it is believed that at least a part of the reaction products of unknown structure consist of three or more of the cycloaliphatic groups joined through divalent sulfur radicals. These products could be represented as A—Y—A—Y—A,

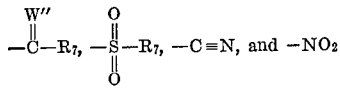

etc., wherein Y is a divalent sulfur radical, $b$ is a positive whole number greater than one and the A's represent cycloaliphatic groups of the types illustrated with regard to the compounds of known structure. Since part of the cycloaliphatic starting material can remain unreacted, it may also be a constituent in the reaction products.

The products and products of this invention are further exemplified by the following examples.

Example 1

A mixture comprising 400 grams of toluene and 66.7 grams of aluminum chloride is charged to a two-liter flask fitted with a stirrer, nitrogen inlet tube, and a solid carbon dioxide-cooled reflux condenser. A second mixture comprising 640 grams (5 moles) of butylacrylate and 240.8 grams of toluene is added to the $AlCl_3$ slurry while maintaining the temperature within the range of 37° to 58° C. over a 0.25 hour period. Thereafter, 313 grams (5.8 moles) of butadiene is added to the slurry over a 2.75 hour period while maintaining the temperature of the reaction mass at 50°–61° C. by means of external cooling. The reaction mass is blown with nitrogen for about 0.33 hour and then transferred to a four-liter separatory funnel and washed with a solution of 150 grams of concentrated hydrochloric acid in 1100 grams of water. Thereafter, the product is subjected to two additional water washings using 1000 ml. of water for each wash. The washed reaction product is subsequently distilled to remove unreacted butylacrylate and toluene. The residue of this first distillation step is subjected to further distillation at a pressure of 9–10 millimeters of mercury whereupon 785 grams of the desired product is collected over the temperature of 105°–115° C.

Example 2

The adduct of isoprene and acrylonitrile is prepared by mixing 136 grams of isoprene, 106 grams of acrylonitrile, and 0.5 gram of hydroquinone (polymerization inhibitor) in a rocking autoclave and thereafter heating for 16 hours at a temperature within the range of 130–140° C. The autoclave is vented and the contents decanted thereby producing 240 grams of a light yellow liquid. This liquid is stripped at a temperature of 90° C. and a pressure of 10 millimeters of mercury thereby yielding the desired liquid product as the residue.

Example 3

Using the procedure of Example 2, 136 grams of isoprene, 172 grams of methylacrylate, and .9 gram of hydroquinone are converted to the isoprene-methylacrylate adduct.

Example 4

Again following the procedure of Example 2, 104 grams of liquified butadiene, 166 grams of methylacrylate, and 1 gram of hydroquinone are charged to the rocking autoclave and heated to 130–135° C. for 14 hours. The product is subsequently decanted and stripped yielding 237 grams of the adduct.

Example 5

The adduct of isoprene and methyl methacrylate is prepared by reacting 745 grams of isoprene with 1095 grams of methyl methacrylate in the presence of 5.4 grams of hydroquinone in the rocking autoclave following the procedure of Example 2 above. 1490 grams of the adduct is recovered.

Example 6

810 grams of the adduct of butadiene and dibutylmaleate are prepared by reacting 915 grams of dibutylmaleate, 216 grams of liquified butadiene, and 3.4 grams of hydroquinone in the rocking autoclave according to the technique of Example 2.

Example 7

A reaction mixture comprising 378 grams of butadiene, 778 grams of N-vinylpyrrolidone, and 3.5 grams of hydroquinone is added to a rocking autoclave previously chilled to −35° C. The autoclave is then heated to a temperature of 130–140° C. for about 15 hours. After venting, decanting, and stripping the reaction mass, 75 grams of the desired adduct are obtained.

Example 8

Following the technique of Example 2, 270 grams of liquified butadiene, 1060 grams of isodecylacrylate, and 4 grams of hydroquinone were reacted in the rocking autoclave at a temperature of 130–140° C. for about 11 hours. After decanting and stripping, 1136 grams of the adduct were recovered.

Example 9

Following the same general procedure of Example 1, 132 grams (2 moles) of cyclopentadiene, 256 grams (2 moles) of butylacrylate, and 12.8 grams of aluminum chloride are reacted to produce the desired adduct. The butylacrylate and the aluminum chloride are first added to a two-liter flask fitted with stirrer and reflux condenser. While heating the reaction mass to a temperature within the range of 59°–52° C., the cyclopentadiene is added to the flask over a 0.5 hour period. Thereafter the reaction mass is heated for about 7.5 hours at a temperature of 95°–100° C. The product is washed with a solution containing 400 milliliters of water and 100 milliliters of concentrated hydrochloric acid and the aqueous layer is discarded. Thereafter, 1500 grams of benzene are added to the reaction mass and the benzene solution is washed with 300 milliliters of water and the aqueous phase removed. The benzene is removed by distillation and the residue stripped at 0.2 millimeter of mercury to recover the adduct as a distillate.

Example 10

Following the technique of Example 2, the adduct of butadiene and allylchloride is prepared using two moles of each reactant.

Example 11

One hundred thirty-nine grams (1 mole) of the adduct of butadiene and methylacrylate is transesterified with 158 grams (1 mole) of decyl alcohol. The reactants are added to a reaction flask and 3 grams of sodium methoxide are added. Thereafter, the reaction mixture is heated at a temperature of 190–200° C. for a period of 7 hours. The reaction mass is washed with a 10% sodium hydroxide solution and then 250 mililiters of naphtha is added. The naphtha solution is washed with water. At the completion of the washing 150 grams of toluene are added and the reaction mass is stripped at 150° C. under pressure of 28 millimeters of mercury. 225 grams of a dark brown fluid product was recovered. This product is fractionated under reduced pressure resulting in the recovery of 178 grams of the product boiling in the range of 130°–133° C. at a pressure of 0.45 to 0.6 millimeters of mercury.

Following known Diels-Alder reaction techniques, for example that of Example 2 above, the adducts of the following dienes and dienophiles are prepared (1:1 mole adducts):

TABLE III

| Ex. No. | Diene | Dienophile |
|---|---|---|
| 12 | Piperylene | Acrolein. |
| 13 | do | 3-CH₃-butene-1. |
| 14 | 1-phenyl-butadiene-1,3 | Styrene. |
| 15 | 1-carboxy-butadiene-1,3 | Acrylic acid. |
| 16 | 1-cyano-butadiene-1,3 | Methylacrylate. |
| 17 | 1-methyl-butadiene-1,3 | Acrolein. |
| 18 | 1-acetyloxy butadiene-1,3 | Acrylic acid. |
| 19 | 1-diethylamino-butadiene-1,3 | Acrolein. |
| 20 | 2-methyl-butadiene-1,3 | o-Nitrocinnamic acid. |
| 21 | 2-phenyl-butadiene-1,3 | Acrylamide. |
| 22 | 2-methoxy-butadiene-1,3 | Acrylic acid. |
| 23 | 2-formyloxy-butadiene-1,3 | β,β-dimethyldivinylketone. |
| 24 | 2-tert butyl-butadiene-1,3 | Ethylmethacrylate. |
| 25 | Butadiene-1,3 | Vinylacetylene. |
| 26 | do | Vinylacetate. |
| 27 | do | Allyl alcohol. |
| 28 | do | 2-nitro-butene-1. |
| 29 | do | Methylvinyl sulfone. |
| 30 | do | Vinyl sulfonyl chloride. |
| 31 | 2,3-dimethyl-butadiene | Vinyl acetate. |
| 32 | Cyclopentadiene-1,3 | Heptene-1. |
| 33 | do | Nitroethylene. |
| 34 | do | Vinyl acetate. |
| 35 | do | Diallyl ether. |
| 36 | do | p-Methoxyethylvinylketone. |
| 37 | Cyclohexadiene-1,3 | Ethyl acrylate. |
| 38 | do | Maleic anhydride. |
| 39 | 1,3-diphenyl-cyclohexadiene-1,3 | Do. |
| 40 | Cycloheptadiene-1,3 | Acrolein. |
| 41 | 1,5,5-trimethyl-cyclohexadiene-1,3 | Dimethyl ester of acetylene dicarboxylic acid. |
| 42 | Butadiene-1,3 | N-(3-oxo-1,1-dimethyl-butyl)-acrylamide. |

The following examples illustrate the preparation of the novel sulfur-containing compounds of the present invention.

Example I (a) To 255 grams (1.65 moles of the isoprene-methacrylate adduct of Example 3 heated to a temperature of 110°–120° C., there are added 53 grams (1.65 moles) of sulfur flowers over a 45 minute period. The heating is continued for 4.5 hours at a temperature in the range of 130°–160° C. After cooling to room temperature, the reaction mixture is filtered through a medium sintered glass funnel. The filtrate consists of 301 grams of the desired sulfur-containing products.

(b) In part (a) the ratio of sulfur to adduct is 1:1. In this example, the ratio is 5:1. Thus, 640 grams (20 moles) of sulfur flowers is heated in a three-liter flask at 170° C. for about 0.3 hour. Thereafter, 600 grams (4 moles) of the isoprene-methacrylate adduct of Example 3 is added dropwise to the molten sulfur while maintaining the temperature at 174°–198° C. Upon cooling to room temperature, the reaction mass is filtered as above, the filtrate being the desired product.

(c) Seven hundred and fifty grams (5 moles) of the adduct employed in (a) and (b) above is heated to 105° C. under reflux conditions. To the heated adduct is added 320 grams (10 moles) of sulfur flowers in five increments over a 0.75 hour period while maintaining the temperature of the reaction mass at 105–112° C. The reaction mixture is heated for 6 hours at 150°–155° C. while bubbling nitrogen through the reaction mass at a rate of 0.25 to 0.5 standard cubic feet per hour. The reaction mass is then cooled and filtered at room temperature yielding 1005 grams of the desired products.

Example II (a) A reaction mixture comprising 1175 grams (6 moles) of the Diels-Alder adduct of butylacrylate and isoprene and 384 grams (12 moles) of sulfur flowers is heated for 0.5 hour at 108°–110° C. and then to 155°–165° for 6 hours while bubbling nitrogen gas through the reaction mixture at 0.25 to 0.5 standard cubic feet per hour. At the end of the heating period, the reaction mixture is allowed to cool and filtered at room temperature. Thereafter, the product is permitted to stand for 24 hours and refiltered. The filtrate weighing 1278 grams is the desired product.

(b) Following the procedure of Example II(a), 1275 grams (6.5 moles) of the adduct and 208 grams (6.5 moles) of sulfur flowers are reacted to produce 1421 grams of the desired sulfur-containing reaction products.

(c) Again, following the technique of (a), 2450 grams (12.5 moles) of the adduct of isoprene and butylacrylate is reacted with 600 grams of sulfur (18.75 moles) to produce 2814 grams of the desired sulfur-containing products.

Example III (a) Sulfur (4.5 moles) and the adduct of isoprene-methylmethacrylate (4.5 moles) are mixed at room temperature and heated for 1 hour at 110° C. while blowing nitrogen through the reaction mass at 0.25–0.5 standard cubic feet per hour. Subsequently the reaction mixture is raised to a temperature of 150°–155° C. for 6 hours while maintaining the nitrogen blowing. After heating, the reaction mass is permitted to stand for several hours while cooling to room temperature and is thereafter filtered. The filtrate consists of 842 grams of the reaction mixture of the desired sulfur-containing product.

(b) Employing the technique of (a), 7.96 moles of sulfur flowers are reacted with 3.98 moles of the isoprene-methylmethacrylate adduct to produce 857 grams of the product.

Example IV (a) Seven hundred grams (5.04 moles) of the adduct of butadiene and methylacrylate are mixed with 323 grams (10.08 moles) of sulfur flowers in the presence of 3% by weight based on the adduct of hydroquinone. The reactants are heated under reflux conditions while bubbling nitrogen through the reaction mass. Heating is gradual at first (room temperature to 110° C. during the first hour and from 110° C. to 140° C. during the second hour). Thereafter, the reaction mixture is heated for 6 hours at a temperature within the range of 150–160° C., permitted to cool to room temperature, and filtered twice. The filtrate consists of 930 grams of the desired sulfur-containing products.

(b) The same process as employed in (a) is repeated employing as the adduct a distilled butadiene-methylacrylate adduct which boils over the range of 71–78° C. under a pressure of 18–19 millimeters of mercury. The reactants, 550 grams of the adduct (4.0 moles) and 256 grams of sulfur flowers (8.0 moles) are placed in a flask fitted with reflux condenser and a nitrogen gas inlet. The mixture is heated under reflux conditions for about 8½ hours at a temperature within the range of 150–160° C. while bubbling nitrogen gas through the mass at a rate of about 0.5 standard cubic feet per hour. Upon cooling to room temperature, the product is filtered yielding 810 grams of the desired product as the filtrate.

Example V

A one-liter flask fitted with a stirrer, reflux, condenser, and nitrogen inlet line is charged with 256 grams (1 mole) of the adduct of butadiene and isodecylacrylate and 64 grams (2 moles) of sulfur flowers and then heated for 12 hours at a temperature, stand for 21 hours, and filtered at room temperature to produce 286 grams of the desired product as the filtrate.

Example VI (a) A mixture comprising 420 grams (1.5 moles) of the adduct of isoprene and decylacrylate and 96 grams of sulfur flowers (3.0 moles) are reacted as in Example V producing 466 grams of the desired products.

(b) Employing the same reactants as in (a) above, the process conditions are modified and the ratio of sulfur to adduct increased from 2:1 to 7:1. A two-liter flask is charged with 224 grams of sulfur flowers (7.0 moles) and heated to 120° C. to convert the sulfur to the molten state. Thereafter, 280 grams of the adduct is added in increments while raising the temperature of the reaction mass to 200° C. The reaction mass is heated for 11½ hours at a temperature of 200–244° C. Upon cooling, there was recovered 366 grams of a dark red viscous liquid which comprises the desired reaction products.

Example VII (a) 4550 grams (25 moles) of the adduct of butadiene-butylacrylate and 1600 grams (50 moles) of sulfur flowers are charged to a 12 liter flask, fitted with stirrer, reflux condenser, and nitrogen inlet tube. The reaction mixture is heated at a temperature within the range of 150–155° C. for 7 hours while passing nitrogen therethrough at a rate of about 0.5 cubic feet per hour. After heating, the mass is permitted to cool to room temperature and filtered, the sulfur-containing products being the filtrate.

It has been found that, if the sulfur-containing products of this invention are treated with an aqueous solution of sodium sulfide, containing from about 5% to about 75% by weight $Na_2S$, the treated product has much less tendency to darken freshly polished copper metal brought in contact with the product. In the so-called Copper Strip Test, the product of VII (a) gives a copper strip rating of 4c (copper is darkened to the point of being almost black). However, when 1000 grams of the product obtained before filtering is mixed with 1000 grams of an 18% solution of sodium sulfide ($Na_2S$) the rating was improved to within the range of 1a to 1b (almost no darkening of the copper).

Treatment involves the mixing together of the sulfurized reaction product and the sodium sulfide solution for a period of time sufficient for unreacted sulfur to be scavenged, usually a period of a few minutes to several hours depending on the amount of unreacted sulfur, the quantity and the concentration of the sodium sulfide solution. The temperature is not critical but normally will be in the range of about 20° C. to about 100° C. After the treatment, the resulting aqueous phase is separated from the organic phase by conventional techniques, i.e., decantation, etc. Other alkali metal sulfides, $M_2S_x$ where M is an alkali metal and $x$ is 1, 2, or 3 may be used to scavenge unreacted sulfur but those where $x$ is greater than 1 are not nearly as effective. Sodium sulfide solutions are preferred for reasons of economy and effectiveness.

One thousand grams of the product of VII(a) obtained before filtering are heated to 100° C. in a three-liter flask fitted with a reflux condenser and stirrer. While stirring the adduct under at high speed, 1000 grams of the sodium sulfide solution are added over a one-minute period, cooling the mass to 38° C. The resulting mixture is again heated to 50° C. and held within the range of 42–50° C. for one hour using an infrared lamp. Upon standing, the reaction mixture separates into an aqueous phase and an organic phase. The lower or aqueous phase is removed. A 440 gram portion of the organic layer is filtered giving a filtrate weighing 401 grams which is the desired product. The remaining portion of the organic layer is washed in 500 grams of water at 40° C. for 10 minutes and thereafter allowed to separate. The organic layer weighing 358 grams is stripped to remove the water. The product after water removal weighed 322 grams. The product obtained by the direct filtration of the sodium sulfide treated sulfur-containing adduct and the product obtained by first washing the sodium sulfide treated adduct were the same, both being substantially free from sodium.

(b) Following the procedure of VII(a), 1092 grams (6 moles) of the adduct of butadiene and butylacrylate and 192 grams (6 moles) of sulfur flowers are heated for 7 hours at a temperature of 150°–155° C. After cooling and filtering, 1217 grams of a clear, yellow liquid filtrate is obtained as the product.

Example VIII

The adduct of butadiene-butylacrylate was prepared by charging 513 grams (4 moles) of butadiene-1,3 to a two-liter flask fitting with a stirrer, reflux condenser, and nitrogen inlet tube. To the butadiene is added 50.4 grams of aluminum chloride ($AlCl_3$) over a one-minute period while stirring the reaction mixture at a temperature within the range of 25°–28° C. A colorless clear solution resulted. The butadiene was blown into the aluminum chloride-butylacrylate mixture over a 1.75 hour period while maintaining the reaction mass at a temperature of 28°–59° C. Then the reaction mass is stirred for two hours while maintaining the temperature within the range of 41°–52° C. followed by the addition of a solution of 150 milliliters of concentrated hydrochloric acid and 1000 grams of water to the reaction mass to hydrolyze the aluminum chloride. The resulting aqueous phase of the reaction mass is discarded. The organic phase is washed with 1000 milliliters of water at 40° C. and the resulting aqueous phase is discarded leaving the organic phase as the desired adduct weighing 735 grams.

Two hundred grams of this product (1.1 moles) and 70.5 grams of sulfur flowers (2.2 moles) are mixed in one-liter flask fitted with a stirrer, reflux condenser, and nitrogen inlet tube. The mixture is heated to about 150° C. over a one-hour period and thereafter is maintained at a temperature of 150°–160° C. for 7 hours. During the reaction, nitrogen gas is blown through the reaction mass at a rate of about 0.25 standard cubic feet per hour. The resulting light orange colored liquid weighing 260 grams is then charged to a three-liter flask fitted with a stirrer and reflux condenser. A mixture of 173 grams of toluene and 260 grams of a 6% sodium sulfide solution in water are then added to the reaction mass and stirred at high speed for one hour at room temperature. After separating into two phases, there is obtained a 405 gram organic phase which is light yellow in color. This organic layer is stripped at reduced pressure to remove water and toluene. The residue weighing 235 grams is a light yellow oil which is filtered to produce 210 grams of the desired purified product as the filtrate.

Example IX

Following the same technique as employed in Example VIII above, 546 grams (3 moles) of the Diels-Alder adduct of butadiene and butylacrylate and 192 grams (6.0 moles) of sulfur flowers are reacted in the presence of 5.5 grams of triamylamine as a sulfurization catalyst. After filtering the product, 659 grams of filtrate consisting of a clear deep orange slightly viscous oil is obtained as the desired sulfur-containing products.

Example X

A reaction mixture comprising 782 grams (4.3 moles) of the Diels-Alder adduct of butadiene and butylacrylate and 138 grams (4.3 moles) of sulfur flowers is gradually heated from room temperature to 150° C. over a one-hour period and thereafter maintained at a temperature of 150–160° C. for 6 hours. The reaction product is then permitted to cool to room temperature and stand for about 12 hours. The product is filtered providing 869 grams of filtrate representing the desired sulfur-containing reaction products.

Examples XI through XXIII illustrate the preparation of other sulfur-containing compounds of the present invention. In each case, the adduct and the sulfur were mixed in a reaction flask and thereafter heated to a temperature within the range of 150–160° C. for a period of 7 to 10 hours while bubbling nitrogen through the reaction mixture. The sulfurized products are then permitted to cool to room temperature and allowed to stand for several hours. Thereafter the reaction mass is filtered, the filtrate representing the desired sulfur-containing products.

TABLE IV

| | Adduct of example number | Molar ratio of sulfur to adduct |
|---|---|---|
| XI | 12 | 2:1 |
| XII | 13 | 2:1 |
| XIII | 14 | 2:1 |
| XIV | 15 | 3:1 |
| XV | 21 | 2:1 |
| XVI | 23 | 4:1 |
| XVII | 25 | 5:1 |
| XVIII | 29 | 2:1 |
| XIX | 30 | 2:1 |
| XX | 31 | 2:1 |
| XXI | 35 | 2:1 |
| XXII | 40 | 2:1 |
| XXIII | 41 | 2:1 |
| XXIV | 2 | 2:1 |
| XXV | 42 | 2:1 |

Similarly other Diels-Alder adducts of the type disclosed above can be sulfurized in the manner illustrated by the foregoing examples to prepare other sulfurized Diels-Alder adducts of the type contemplated by the present invention.

It has also been determined that treatment of the reaction mass with solid, insoluble acidic materials such as acidified class or acidic resins and thereafter filtering the sulfurized reaction mass improves the product with respect to its color and solubility characteristics. Such treatment comprises thoroughly mixing the reaction mixture with from about 0.1% to about 10% by weight of the solid acidic material at a temperature of about 25° C.–150° C. and subsequently filtering the mass.

As previously mentioned, there is no need to separate the sulfur-containing products which are produced in the above reactions. The reaction product is a mixture which comprises the compounds whose structures have been ascertained but which also comprises compounds whose structures are unknown. Since it is economically unfeasible to separate the components of one reaction mixture, they are employed in combination as a mixture of sulfur-containing compounds.

In order to remove the last traces of impurities from the reaction mixture, particularly when the adduct employed was prepared using a Lewis acid catalyst, (e.g., $AlCl_3$) it is sometimes desirable to add an organic inert solvent to the liquid reaction product and, after thourough mixing, to refilter the material. Subsequently the solvent is stripped from the product. Suitable solvents include solvents of the type mentioned herein above such as benzene, toluene, the higher alkanes, etc. A particularly useful class of solvents are the textile spirits.

In addition, other conventional purification techniques can be advantageously employed in purifying products of this invention. For example, commercial filter aids can be added to the materials prior to filtration to increase the efficiency of the filtration. Filtering through diatomaceous earth is particularly useful where the use contemplated requires the removal of substantially all solid materials. However, such expedients are well known to those skilled in the art and require no elaborate discussion herein.

LUBRICANT COMPOSITIONS

The sulfur-containing products of the present invention will normally be employed in an amount of from about 0.001% to about 20% by weight of the particular hydrocarbon liquid in which they are utilized. The compounds can be utilized in mineral lubricating oil compositions, synthetic lubricating oil compositions, cutting oils, gasolines, fuel oils, diesel fuels, etc. The optimum amount to be used in a given composition obviously would depend on the contents of the particular lubricating composition, the operating conditions to which it is to be subjected, and the particular additives employed. Thus, when employed as an oxidation-corrosion inhibitor in lubricating oils for internal combustion engines, the sulfur-containing compositions of the invention will normally be employed in an amount of from about 0.05% to about 5% by weight. However, when employed as an extreme pressure additive, such as in gear lubricants, the sulfur-containing compounds will be employed in amounts of from about 1% up to about 10% by weight or even higher.

It is also contemplated that the lubricating compositions can encompass additives in addition to the sulfur-containing compounds described herein. Illustrative of such additives are detergents of the ash-producing or the ashless type, pour point depressants, viscosity index improvers, anti-foam agents, rust inhibitors, other extreme pressure agents, additional oxidation and corrosion inhibiting agents, and the like. These additional constituents will be present in the lubricating compositions, if required, in amounts of about 0.001% to about 10% by weight.

The ash-containing detergents include the oil-soluble neutral and basic salts of alkaline earth or alkali metals with sulfonic acids, carboxylic acids, or organic phosphorus acids having at least one direct carbon-to-phosphorus linkage such as those prepared by the treatment of an olefin polymer (e.g., polyisobutene having a molecular weight of about 1000) with a phosphorizing agent, e.g., phosphorus trichloride, phosphorus heptasulfide, phosphorus pentasulfide, etc. The most commonly used salts of these acids are those of sodium, potassium, lithium, calcium, magnesium, and barium. The basic salts are those acid salts wherein the metal is present in stoichiometrically larger amounts than in the normal neutral organic acid salts. These "overbased" salts are well known in the art and have been used extensively in the lubricant field.

Ashless detergents contemplated as additives in the compositions of the invention are illustrated by those disclosed in U.S. Pats. 3,172,892; 3,219,666; etc.

Other extreme pressure agents and oxidation-corrosion inhibiting agents are exemplified by chlorinated aliphatic hydrocarbons such as chlorinated wax; organic sulfides and polysulfides such as benzylsulfide, bis-(chlorobenzyl) disulfide, dibutyltetrasulfide, phosphosulfurized hydrocarbons such as the reaction product of a phosphorus sulfide with turpentine or methyloleate; phosphorus esters including principally dihydrocarbon and trihydrocarbon phosphites such as dibutylphosphite, diheptylphosphite, dicyclohexylphosphite, pentylphenylphosphite, distearylphosphite, dimethylnaphthylphosphite, polypropylene (molecular weight of about 500)-substituted phenylphosphite, dipentylphenylphosphite, tridecylphosphite, diisobutyl-substituted phenylphosphite; metal thiocarbamates such as zinc dioctyldithiocarbamate, barium heptylphenyldithiocarbamate; Group II metal phosphorodithioates such as zinc dicyclohexylphosphorodithioate, zinc dioctylphosphorodithioate, barium di(heptylphenyl) phosphorodithioate, cadmium dinonylphosphorodithioate, and the metal salt (e.g., zinc, lead, calcium, etc.) of a phosphorodithioic acid produced by the reaction of a phosphorus pentasulfide with an equimolar mixture of isopropanol and n-hexyl alcohol, or an equivalent amount of other alkanols or cycloalkanols such as disclosed in 2,820,723 and 2,861,907. The zinc salts are preferred.

Another class of useful additives which can advantageously be incorporated into the compositions of the present invention is the so-called hindered phenols, that is, phenolic compounds characterized by substituents in both positions ortho to the phenolic hydroxyl group. Examples of such phenols include 2,6-dialkylphenols and 2,4,6-trialkylphenols such as 2,6-di-(tertbutyl)-4-methylphenol, 2,6-di-(tert-butyl)-phenol, and 2,4,6-tri-(tert-butyl)-phenol. The alkyl groups will contain from one to eight carbons and preferably will be branched, especially on the alpha carbon. Other hindered phenol include 2,6-dimethyl-4-cyclohexylphenol; 2,6-dicyclohexyl-4-methylphenol, etc. Also useful are hindered bisphenols such as 1,1-bis(3,5-dialkyl-4-hydroxyphenyl) methanes in which all the alkyl groups contain from 1 to 8 and preferably from about 3 to 8 carbons. Again, alkyl groups which are branched on their respective alpha carbon atoms are particularly useful. Examples of these bisphenols include 1,1-bis-[3,5-di-(tert-butyl)-4-hydroxy-phenyl]methane, 1,1-bis-[3,5-di(2-octyl)-4-hydroxy-phenyl]-methanes, and the like.

A particularly useful combinations are those wherein at least one tri-hydrocarbyl-phosphite and at least one hindered phenol are used in combination with the sulfur-containing compounds of the present invention as additives for lubricating oils. This combination can be employed with additional additives as set forth above. Generally the lubricant will contain from about 0.01% to 10% by weight and preferably, from about 0.05% to about 5.0% of each of these three constituents. The term "hydrocarbyl" is intended to include any monovalent hydrocarbon radical. Examples of such phosphites include trialkylphosphites such as tridecylphosphite; triarylphosphites such as triphenylphosphite; triaryl phosphites wherein the aryl groups include one or more substituents particularly alkyl substituents; dialkylarylphosphites such as dipentylphenylphosphite and dimethylnaphthylphosphate; alkyldiarylphosphites such as decyldiphenyl phosphites, etc.

The following are illustrative examples of lubricant compositions containing the sulfur-containing compounds of the present invention. All percentages refer to percent by weight of total composition.

Example A

SAE 10W–30 mineral lubricating oil containing 1% of the product of Example I (a).

Example B

SAE 80 mineral lubricating oils containing 2% of the product of Example II(a), 0.1% of phosphorus as zinc di-n-hexyl phosphorodithioate, 10% of a chlorinated paraffin wax having a chlorine content of 40%, 2% of sulfurized cymene, 0.2% of oleyl amide, 0.003% of a poly-(alkyl-siloxane) as an anti-foaming agent, 0.02% of a pour point depressant, and 3% of a viscosity index improver.

Example C

SAE 30 mineral lubricating oil containing 5% of the product of Example III(b), 0.075% of phosphorus as zinc di-n-octylphosphorodithioate, and 5% of the barium salt of an acidic composition prepared by the reaction of 1000 parts of a polyisobutylene having a molecular weight of about 60,000 with 100 parts of phosphorus pentasulfide at 200° C. and hydrolyzing the product with steam at 150° C.

Example D

SAE 10W–30 mineral lubrication oil containing 4% of the product of Example V, 2% of the product obtained from reacting at 150°–165° C. for four hours while blowing with nitrogen 1000 parts by weight of polyisobutene-substituted succinic anhydride (average mol wt. of polyisobutylene substituent: 750), 70 parts of a commercially available ethylene polyamine mixture having an average composition of tetraethylene pentamine in 500 parts of mineral oil; and 10% of sulfate ash as barium mahogany sulfonate.

Example E

SAE 20 mineral lubricating oil containing 0.4% of the Na$_2$S-treated product of Example VII(a), 0.2% of 2,4,6- tri-(tert-butyl)-phenol and 0.4% by weight of tri-tolyl-phosphite.

The corrosion-oxidation inhibiting qualities of the sulfur-containing compounds of the present invention is illustrated by engine test of lubricants containing these compounds. In a standard test for the industry, a lubricant containing the particular additive to be tested is placed in an engine and then the engine is operated for forty hours. At the end of the forty-hour period, the bearings are weighed to determine the loss of metal during engine operation. An additive is considered to be an effective corrosion-oxidation inhibitor in this particular test if the weight loss is 50 milligrams or less. Thus, when the product of Example I(c) is employed in a lubricating oil composition at a concentration of 0.4% by volume, the bearings undergo a 29.5 milligram weight loss; a similar concentration of the product of Example VII(a) is characterized by 18.3 milligram weight loss, while the same concentration of the product of Example VIII limits the bearings weight loss of 16.6 milligrams.

Similarly, other of the novel sulfur-containing products tested at concentrations as low as 1% or less resulted in bearing weight losses ranging from 19.0 milligrams to 45.3 milligrams. It is obvious that the results achieved with any given sulfur-containing compound will vary as the overall composition of the oil is varied. For example certain additives used in the lubricating art tend to promote corrosion. In the presence of such additives, it is obvious that more of the sulfur-containing compounds of the invention may be necessary to maintain comparable low-level bearing weight losses.

The ability of the sulfur-containing compounds to impart extreme pressure properties to lubricants is readily illustrated by the Timken OK Load Test. For example, an SAE 90 mineral oil composition containing 1% by weight of the product of Example VIII produced a test result of 45 lbs.; at 1.5% the result was 55 lbs. However, in the absence of the sulfur-containing compound of the invention, the test result was 15 lbs.

While the novel sulfur-containing compound of the present invention are primarily intended to be used as additives in hydrocarbon fuels and lubricating compositions, they also have properties which make them useful as accelerators in rubber treating processes, as pesticides such as insecticides and fungicides, as plasticizers, as asphalt additives, as ore-floatation agents and the like. The manner for employing the present compound in these additional fields of use will be apparent to those skilled in the art.

What is claimed is:

1. Oil-soluble sulfur-containing compounds produced by reacting sulfur with at least one Diels-Alder adduct, at a temperature within the range of from about 110° C. to just below the decomposition temperature of said Diels-Alder adduct, the molar ratio of sulfur to adduct being from about 0.5:1 to about 10:1 wherein the adduct consists essentially of the 1:1 adduct of at least one dienophile selected from the group consisting of $\alpha,\beta$-ethylenically unsaturated aliphatic carboxylic acid esters, $\alpha,\beta$-ethylenically unsaturated aliphatic carboxylic acid amides, and $\alpha,\beta$-ethylenically unsaturated aliphatic halides with at least one aliphatic conjugated diene corresponding to the formula

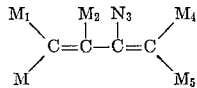

where M through $M_5$ are each independently selected from the group consisting of hydrogen, alkyl, halo, alkoxy, alkenyl, alkenyloxy, carboxy, cyano, amino, alkylamino, dialkylamino, phenyl, and phenyl substituted with one to three substituents corresponding to M through $M_5$.

2. Oil-soluble sulfur-containing compounds according to claim 1 wherein the molar ratio of sulfur to adduct is about 1:1 to about 4:1.

3. Oil-soluble sulfur-containing compounds according to claim 1 wherein the molar ratio of sulfur to adduct is about 2:1 to about 4:1.

4. Oil-soluble sulfur-containing compounds according to claim 3 wherein the diene is further characterized in that $M_2$ and $M_3$ are hydrogen and M, $M_1$, $M_4$, and $M_5$ are each independently hydrogen, chloro, or lower alkyl.

5. Oil-soluble sulfur-containing compounds according to claim 4 wherein the dienophile is further characterized in that it contains at least one but not more than two

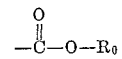

where $R_0$ is the residue of a saturated aliphatic alcohol of up to about forty carbon atoms.

6. Oil-soluble sulfur-containing compounds according to claim 5 wherein the diene is piperylene, isoprene, methylisoprene, chloroprene, or 1,3-butadiene.

7. Oil-soluble sulfur-containing compounds according to claim 6 wherein the dienophile is an ester of acrylic acid or methacrylic acid.

8. Oil-soluble sulfur-containing compounds according to claim 7 where the dienophile is an alkyl ester of acrylic acid or methacrylic acid containing at least four carbon atoms in the alkyl group.

9. Oil-soluble sulfur-containing compounds according to claim 8 wherein the diene is 1,3-butadiene.

10. Oil-soluble sulfur-containing compounds according to claim 1 produced by reacting sulfur with at least one Diels-Adler adduct at a temperature of about 110° C. to about 200° C., the molar ratio of sulfur to adduct being from about 2:1 to about 4:1 wherein the adduct consists essentially of the 1:1 mole adduct of at least one dienophile selected from the group consisting of $\alpha,\beta$-ethylenically unsaturated aliphatic carboxylic acid esters with at least one dienophile where $M_2$ and $M_3$ are each hydrogen and M, $M_2$, $M_4$ and $M_5$ are each independently hydrogen, chloro, or lower alkyl.

11. Oil-soluble sulfur-containing compounds according to claim 10 wherein the $\alpha,\beta$-ethylenically unsaturated carboxylic acid esters are alkyl esters of acrylic acid or methacrylic acid where the carboalkoxy groups contain up to thirty-one carbon atoms.

References Cited

UNITED STATES PATENTS 2,733,235   1956   Cross et al. _____ 260—125

JOSEPH REBOLD, Primary Examiner
D. R. PHILLIPS, Assistant Examiner

U.S. Cl. X.R.

260—128, 132, 138, 139, 608

UNITED STATES PATENT OFFICE
CERTIFICATE OF CORRECTION

Patent No. 3,632,566          Dated  January 4, 1972

Inventor(s) Lester E. Coleman

It is certified that error appears in the above-identified patent and that said Letters Patent are hereby corrected as shown below:

At column 23, line 64, that is Claim 1, line 14,

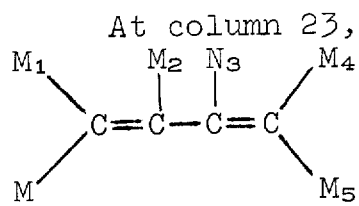   should be   -- 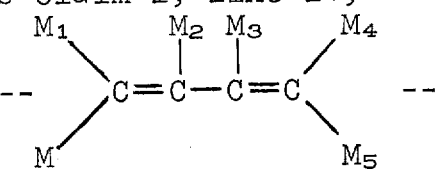 --

Signed and sealed this 2nd day of April 1974.

(SEAL)
Attest:

EDWARD M. FLETCHER, JR.              C. MARSHALL DANN
Attesting Officer                    Commissioner of Patents